(12) United States Patent
Serizawa et al.

(10) Patent No.: US 7,657,410 B2
(45) Date of Patent: Feb. 2, 2010

(54) PROCESS SIMULATION SYSTEM

(75) Inventors: Kazuaki Serizawa, Ichinomiya (JP); Shoichi Tanaka, Gifu (JP); Katsuyoshi Ishida, Gifu (JP)

(73) Assignee: Howa Machinery, Ltd., Aichi-Ken (JP)

( * ) Notice: Subject to any disclaimer, the term of this patent is extended or adjusted under 35 U.S.C. 154(b) by 544 days.

(21) Appl. No.: 10/578,241

(22) PCT Filed: Nov. 9, 2004

(86) PCT No.: PCT/JP2004/016596

§ 371 (c)(1),
(2), (4) Date: May 4, 2006

(87) PCT Pub. No.: WO2005/045540

PCT Pub. Date: May 19, 2005

(65) Prior Publication Data

US 2007/0088533 A1 Apr. 19, 2007

(30) Foreign Application Priority Data

Nov. 11, 2003 (JP) .............................. 2003-380656

(51) Int. Cl.
*G06F 9/45* (2006.01)
(52) U.S. Cl. ............................................. 703/6; 703/22
(58) Field of Classification Search .................... 703/6, 703/22
See application file for complete search history.

(56) References Cited

U.S. PATENT DOCUMENTS 4,967,386 A * 10/1990 Maeda et al. ................. 703/17
5,544,348 A    8/1996 Umeda et al.
6,516,237 B1   2/2003 Aoki et al.
6,970,816 B1 * 11/2005 Bryan et al. ................. 703/22

FOREIGN PATENT DOCUMENTS

| JP | 61-61752   |   | 3/1986  |
| JP | 4-64164    |   | 2/1992  |
| JP | 10-55393   | A | 2/1998  |
| JP | 10-335193  |   | 12/1998 |

OTHER PUBLICATIONS

Patent Abstract of Japan Publication No. 10-055393 Published Feb. 24, 1998.
Patent Abstracts of Japan of JP 61-61752 dated Mar. 29, 1986.

* cited by examiner

*Primary Examiner*—Kidest Bahta
*Assistant Examiner*—Dwin M Craig
(74) *Attorney, Agent, or Firm*—Ladas and Parry LLP

(57) ABSTRACT

A tabular form element arrangement data describing the arrangement of various component elements constituting a production system along the work flow in a combination of process identification names with component element names, is prepared. Element definition files describing programs for simulating the operations of various component elements are prepared. A program preparation unit sequentially reads component element names combined with process identification names from the element arrangement data and sequentially reads the element definition files corresponding to the read component element names. A variable array containing variables described in respective element definition files is prepared simultaneously along with an initial process program array containing programs described in respective definition files and a simulation program array. The initial process programs contained in the initial process program array are executed to correspond variables referring to each other and the operations of various component elements constituting a production system are simulated.

4 Claims, 16 Drawing Sheets

FIG. 2

| POSITION IN ELEMENT ARRAY | MODULE NAME | PROCESS NAME | ELEMENT NAME | VARIABLE TOP POSITION | NUMBER |
|---|---|---|---|---|---|
| 1 | FRONT STOCKER | | FRONT STOCKER | 1 | P0 |
| 2 | 140T | CONVEYOR | CONVEYOR | n1+1 | P1 |
| 3 | 140T | CONNECTING TABLE | CONNECTING TABLE | n2+1 | P2 |
| 4 | 140T | INTEGRAL | INTEGRAL 1 | n3+1 | ⋮ |
| 5 | 140T | CONVEY | LF CONVEY | ⋮ | ⋮ |
| 6 | 140T | 1ST | JIG 1 | | |
| 7 | 140T | 1ST | UNIT 1 | | |
| 8 | 140T | 2ST | JIG 1 | | |
| 9 | 140T | 2ST | UNIT 1 | | |
| 10 | 140T | REAR CONNECTING TABLE | CONNECTING TABLE | | |
| 11 | 140T | CARRY-OUT CONVEYOR | CONVEYOR | | |
| 12 | REAR STOCKER | | REAR STOCKER | | |
| 13 | MAINTENANCE COMMAND | | MAINTENANCE COMMAND 1 | | |
| 14 | MAINTENANCE MEMBER A | | MAINTENANCE MEMBER | ⋮ | ⋮ |
| 15 | MAINTENANCE MEMBER A | | MAINTENANCE MEMBER | | |

Columns 2–4 are grouped under PROCESS IDENTIFICATION NAMES. The array is labeled 5 (ELEMENT ARRAY).

FIG. 8

| VARIABLE POSITION (ADDRESS) | ATTRIBUTE | 6 (VARIABLE ARRAY) VARIABLE NAME | VALUE/ POSITION | |
|---|---|---|---|---|
| 1 | INTERNAL | d1 | 0mm | ⎫ |
| 2 | INTERNAL | d2 | 30mm | |
| | | | | |
| Q1 | INTERNAL | MACHINE STATUS | 0 | FRONT STOCKER |
| | | ... | | |
| | | ... | | ⎭ |
| n1+1 | | ... | | ⎫ |
| R3 | TAKE-OUT | a1 | *** | CONVEYOR (140T CONVEYOR) |
| | | ... | | ⎭ |
| n2+1 | | ... | | ⎫ |
| | EXTERNAL REFERENCE | b1' | R4 | CONNECTING TABLE |
| | EXTERNAL REFERENCE | a1" | R3 | (140T CONNECTING TABLE) |
| | | ... | | ⎭ |
| n3+1 | | | | ⎫ INTEGRAL 1 |
| L0 | TAKE-OUT | UNCLAMP T[0] | 2 | (140T INTEGRAL) |
| L0+1 | TAKE-OUT | UNCLAMP T[1] | f5 | UNCLAMP TABLE |
| L0+2 | TAKE-OUT | UNCLAMP T[2] | ... | ⎭ 20 |
| n4+1 | | ... | | ⎫ |
| R4 | TAKE-OUT | b1 | ** | LF CONVEY (140T CONVEY) |
| | | ... | | |
| | | ... | | ⎭ |
| n5+1 | INTERNAL | ... | | ⎫ |
| Q5 | INTERNAL | MACHINE STATUS | 0 | |
| f5 | INTERNAL | UNCLAMP | 0 | |
| ... | EXTERNAL REFERENCE | INTEGRAL / UNCLAMP | L0+1 | JIG (140T1ST) |
| ... | EXTERNAL REFERENCE | MAINTENANCE COMMAND/MACHINE STATUS | T0+5 | |
| ... | EXTERNAL REFERENCE | UNIT PROCESS COMPLETE | R7 | |
| R5 | TAKE-OUT | PROCESS PREPARATION COMPLETE | 0 | |
| | | ... | | ⎭ |
| n6+1 | INTERNAL | FORWARD MOVING SPEED | *mm/s | ⎫ |
| Q6 | INTERNAL | MACHINE STATUS | 0 | |
| | | ... | | |
| | INTERNAL | TROUBLE GENERATING TIME | 1HOUR | |
| | INTERNAL | TROUBLE REPAIR TIME | 3HOUR | |
| | INTERNAL | TROUBLE GENERATING TIME count | 0HOUR | UNIT (140T1ST) |
| | INTERNAL | TROUBLE GENERATION EXECUTION | 1(YES) | |
| | | ... | | |
| | TAKE-OUT | UNIT ORIGINAL POSITION | ** | ⎭ |

(CONTINUED ON THE FOLLOWING PAGE)

FIG. 9

(CONTINUED FROM THE PREVIOUS PAGE)

6 (VARIABLE ARRAY)

| VARIABLE POSITION (ADDRESS) | ATTRIBUTE | VARIABLE NAME | VALUE/ POSITION | |
|---|---|---|---|---|
| R7 | TAKE-OUT | PROCESS COMPLETE | 0 | |
| | | ... | | |
| R6 | EXTERNAL REFERENCE | SELF-PROCESS PREPARATION COMPLETE | R5 | UNIT 1 (CONTINUED) |
| t6 | EXTERNAL REFERENCE | MAINTENANCE COMMAND/MACHINE STATUS | T0+6 | |
| | | ... | | |
| | | ... | | JIG 1 (140T2ST) |
| | | ... | | UNIT 1 (140T2ST) |
| | | | | CONNECTING TABLE: 140T REAR CONNECTING TABLE |
| | | | | CONVEYOR (140T CARRY-OUT CONVEYOR) |
| | | | | REAR STOCKER (REAR STOCKER) |
| | | | | 20 |
| T0 | TAKE-OUT | MACHINE STATUS | 11 | |
| L0+1 | TAKE-OUT | MACHINE STATUS T[1] | Q1 | |
| L0+2 | TAKE-OUT | MACHINE STATUS T[2] | Q2 | MACHINE STATUS T TABLE |
| ... | TAKE-OUT | ... | | MAINTENANCE COMMAND 1 (MAINTENANCE COMMAND) |
| T0+11 | TAKE-OUT | MACHINE STATUS T[11] | Q11 | |
| "WORKER STATUS T" TABLE | | | | 20 |
| | | ... | | MAINTENANCE MEMBER (MAINTENANCE MEMBER A) |
| | | ... | | MAINTENANCE MEMBER (MAINTENANCE MEMBER B) |

| VARIABLE POSITION (ADDRESS) | ATTRIBUTE | VARIABLE NAME | VALUE/ POSITION | |
|---|---|---|---|---|
| R5 | TAKE-OUT | PROCESS PREPARATION COMPLETE | 0 | JIG 1 (140T1ST) |
| R6 | EXTERNAL REFERENCE | SELF-PROCESS PREPARATION COMPLETE | (BLANK) | UNIT 1 (140T1ST) |

6 (VARIABLE ARRAY)

⇩ (CORRESPONDING PROCESS)

(B)

| | | | | |
|---|---|---|---|---|
| R5 | TAKE-OUT | PROCESS PREPARATION COMPLETE | 0 | JIG 1 (140T1ST) |
| R6 | EXTERNAL REFERENCE | SELF-PROCESS PREPARATION COMPLETE | R5 | UNIT 1 (140T1ST) |

6 (VARIABLE ARRAY)

| VARIABLE POSITION | ATTRIBUTE | VARIABLE NAME | VALUE/POSITION | |
|---|---|---|---|---|
| Q1 | INTERNAL | MACHINE STATUS | 0 | FRONT STOCKER |
| t1 | EXTERNAL REFERENCE | MAINTENANCE COMMAND/MACHINE STATUS | (BLANK) | |
| Q6 | INTERNAL | MACHINE STATUS | 0 | UNIT 1 (140T1ST) |
| t6 | EXTERNAL REFERENCE | MAINTENANCE COMMAND/MACHINE STATUS | (BLANK) | |
| ... | | | | |
| T0 | TAKE-OUT | MACHINE STATUS T [0] | 0 | 6 (VARIABLE ARRAY) MACHINE STATUS T TABLE |
| T0+1 | TAKE-OUT | MACHINE STATUS T [1] | 0 | |
| ... | | | | |
| T0+6 | TAKE-OUT | MACHINE STATUS T [6] | 0 | |
| ... | | | | |
| T0+11 | TAKE-OUT | MACHINE STATUS T [11] | 0 | |

⇩ (CORRESPONDING PROCESS)

(B)

| VARIABLE POSITION | ATTRIBUTE | VARIABLE NAME | VALUE/POSITION | |
|---|---|---|---|---|
| Q1 | INTERNAL | MACHINE STATUS | 0 | FRONT STOCKER |
| t1 | EXTERNAL REFERENCE | MAINTENANCE COMMAND/MACHINE STATUS | (T0+1) | |
| Q6 | INTERNAL | MACHINE STATUS | 0 | UNIT 1 (140T1ST) |
| t6 | EXTERNAL REFERENCE | MAINTENANCE COMMAND/MACHINE STATUS | T0+6 | |
| ... | | | | |
| T0 | TAKE-OUT | MACHINE STATUS T [0] | 0 | 6 (VARIABLE ARRAY) MACHINE STATUS T TABLE |
| T0+1 | TAKE-OUT | MACHINE STATUS T [1] | 0 | |
| ... | | | | |
| T0+6 | TAKE-OUT | MACHINE STATUS T [6] | 0 | |
| ... | | | | |
| T0+11 | TAKE-OUT | MACHINE STATUS T [11] | 0 | |

⇩ (INITIAL PROCESS)

(C)

| VARIABLE POSITION | ATTRIBUTE | VARIABLE NAME | VALUE/POSITION | |
|---|---|---|---|---|
| Q1 | INTERNAL | MACHINE STATUS | 0 | FRONT STOCKER |
| t1 | EXTERNAL REFERENCE | MAINTENANCE COMMAND/MACHINE STATUS | T0+1 | |
| Q6 | INTERNAL | MACHINE STATUS | 0 | UNIT 1 (140T1ST) |
| t6 | EXTERNAL REFERENCE | MAINTENANCE COMMAND/MACHINE STATUS | T0+6 | |
| ... | | | | 6 (VARIABLE ARRAY) |
| T0 | TAKE-OUT | MACHINE STATUS T [0] | ⑥ | REGISTERED N |
| T0+1 | TAKE-OUT | MACHINE STATUS T [1] | Q1 | |
| ... | | | | MACHINE STATUS T TABLE |
| T0+6 | TAKE-OUT | MACHINE STATUS T [6] | Q6 | |
| ... | | | | |
| T0+11 | TAKE-OUT | MACHINE STATUS T [11] | 0 | |

FIG. 12

7 (EXTERNAL REFERENCE VARIABLE CORRESPONDING ARRAY)

| POSITION IN ELEMENT ARRAY | EXTERNAL REFERENCE VARIABLE NAME | REFERRING VARIABLE NAME | REFERRING MODULE NAME PROCESS NAME |
|---|---|---|---|
| 3 | b1' | b1 | 140T CONVEY |
| 3 | a1" | a1 | 140T CONVEYOR |
| ... | | | |
| ... | | | |
| 3 | SELF-PROCESS PREPARATION COMPLETE | PROCESS PREPARATION COMPLETE | 1401ST |
| ... | | | |
| | | | |
| | | | |
| | | | |

FIG. 13

8 (INITIAL PROCESS PROGRAM ARRAY)

| FRONT STOCKER |
|---|
| CONVEYOR |
| CONNECTING TABLE |
| INTEGRAL 1 |
| LF CONVEY |
| JIG 1 |
| UNIT 1 |
| JIG 1 |
| UNIT 1 |
| CONNECTING TABLE |
| CONVEYOR |
| REAR STOCKER |
| MAINTENANCE COMMAND |
| MAINTENANCE MEMBER |
| MAINTENANCE MEMBER |

FIG. 14

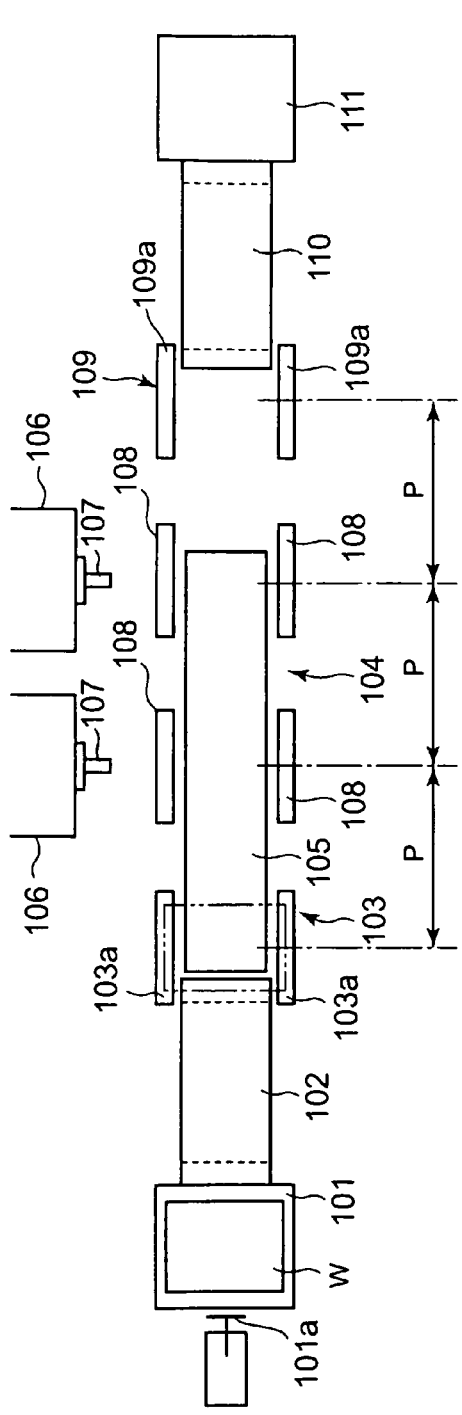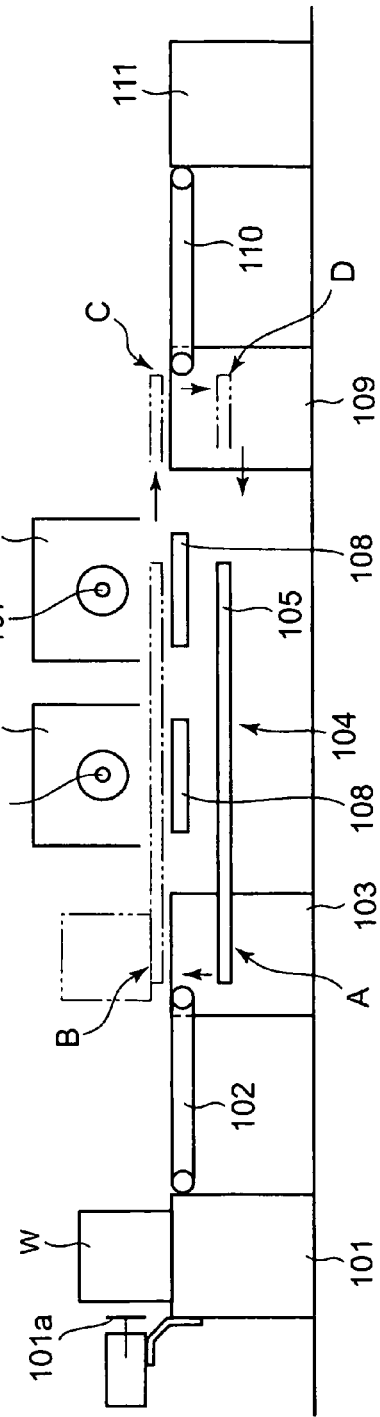

PROCESS SIMULATION SYSTEM

TECHNICAL FIELD

The present invention relates to a process simulation system of a production system (for example, a transfer line, etc.) in which a number of component elements (for example, processing units, clamp units, conveying units, etc.) are operated in cooperation with each other.

BACKGROUND ART

There is a process simulation system so far disclosed in Patent Document 1 (Japanese Patent Laid-Open Publication No. 4-64164). In this system, simulation models of component elements of a production system are shown in a tabular form. These models are spread out in the internal memory and the simulation is carried out while exchanging data between related models by referring to related frame lists. As simulation models of component elements, models regarding operators, production cells, and conveying system are described as examples.

In Patent Document 2 (the Japanese Patent Laid-Open Publication No. 61-61752), a process simulation system is described. In this system, variable data relative to machine tools, setup station, conveying machine, process works, etc. are input into input data files. Processing works, etc. are input into data files. And the process simulation is carried out based on these variable data and a simulation result is output.

In the Patent Document 3 (the Japanese Patent Laid-Open Publication No. 10-335193), a system capable of setting up simulation models and parameters for LSI manufacturing process equipment individually is described.

DISCLOSURE OF THE INVENTION

The present invention is made in view of the background art described above and it is an object to provide a process simulation system capable of easily preparing a simulation program for executing a process simulation of a production system, and of easily dealing with increase and decrease of processes in a production system to be simulated.

The present invention provides a process simulation system for executing a process simulation of a production system, comprising: an element arrangement data reading means for sequentially reading component element names which are combined with process identification names from an element arrangement data, the element arrangement data describing an arrangement of various component elements constituting the production system with combinations of the process identification names and the component element names along a work flow; an element definition file reading means for sequentially reading element definition files corresponding to component element names which had been read in by the element arrangement data reading means from a plurality of element definition files, the element definition files describing simulation programs for executing operational simulations of the various component elements for each of the component elements; a program array preparing means for preparing a simulation program array by sequentially arranging simulation programs respectively described in element definition files which had been read in by the element definition file reading means; and a program execution means for simulating operations of the various component elements constituting the production system by executing a series of simulation programs included in the simulation program array prepared by the program array preparing means.

Preferably, in the present invention, the element arrangement data comprise tabular form data prepared using a software capable of editing to, for example, add and delete textual information, the work flow being set in a row direction, and the process identification names and the component element names being described in a line direction.

Preferably, in the present invention, each of the element definition files contains a program description describing an own simulation program and a variable description describing a variable used in the own simulation program, in the variable description, an external reference variable to designate a referring variable being defined in a case of an element definition file to refer to a variable in an other element definition file, and a take-out variable referred to by an external reference variable being defined in a case of an element definition file to make an other element definition file refer to a variable. The process simulation system further comprises: a variable array preparation means for preparing a variable array including all variables described in the variable description of each of the element definition files which had been read by the element definition file reading means; and a variable corresponding means for making the external reference variable contained in the variable array prepared by the variable array preparation means correspond to the take-out variable.

Preferably, in the present invention, a variable name replacing data for replacing a variable name described in the variable description of each of the element definition files to a different variable name is described in the element arrangement data. The process simulation system further comprising a variable name replacing means for replacing a variable name for which the variable name replacing data is set in the element arrangement data to an other variable name described in the variable name replacing data.

Preferably, in the present invention, in the variable array prepared by the variable array preparation means, a variable table provided with a required number of registration areas for collectively controlling same kinds of variables ranging among a plurality of component elements. In element definition files containing the same kinds of variables that are controlled collectively out of the element definition files, initial processing programs to register positions of the variables in the variable array are described in corresponding variable tables in the variable array prepared in accordance with the variables. The program array preparation means prepares an initial process program array by sequentially arranging the initial process programs respectively described in the element definition files which had been read by the element definition file reading means. The program execution means executes initial process programs contained in the initial process program array prepared by the program array preparation means and registers positions of the variables in the variable array on the variable table in the variable array for the same kind of variables to be collectively controlled.

Preferably, in the present invention, a simulation program described in the program description of each of the element definition files is described in a ladder language type command group.

The process simulation system of the present invention may be provided in the form of computer readable recording medium storing a program which, when executed, causes a computer to function as the process simulation system.

According to the present invention, the element arrangement data describing the arrangement of various component elements constituting a production system along the work flow in the combination of process identification names and component element names are prepared. The process identification names and component element names are sequentially read in accordance with the element arrangement data thus prepared. The element definition files corresponding to the read component element names are read sequentially. The simulation programs described therein are sequentially stored in the simulation program array and a series of simulation programs that are finally executed are prepared. Therefore, even when the same component elements exist at different arranging positions in the element arrangement data, these component elements are identified as different component elements by the combination of component element names and the process identification names. Accordingly, regarding the element definition files of the same component elements, it is necessary to describe only one kind of component element and the work to prepare element definition files when preparing simulation programs becomes easy. Further, since the simulation program array is prepared based on element arrangement data, even when the element arrangement data is changed for executing a different process, it becomes easy to prepare a series of simulation programs corresponding to the changed element arrangement data.

Further, in the present invention, when element arrangement data are prepared using a software that is capable of making such editing works as addition, deletion, etc. of textual information, it becomes easy to newly add/delete a combination of process identification names and component element names to/from the element arrangement data utilizing the editing function of the software and the element arrangement data reflecting addition/deletion of processes of a production system to be simulated can be prepared very easily.

Further, when variable names described in the element definition files are replaced by different variable names based on variable name replacing data described in the element arrangement data in this invention, for example, by replacing reference variable names of external reference variables described in the element arrangement data with concrete names described in the element arrangement data, it becomes possible to designate various referencing variables using one element definition file. Further, when same kind of plural processing units are arranged in the same process, different processing units can be distinguished using one element definition file by replacing general variable names showing processing units with different variable names distinguishing processing units.

Furthermore, when variables that are convenient for the collective control (for example, variables regarding the trouble state of machines) are so described in advance in the element definition file and the variables are collectively controlled in a variable table prepared in advance in the present invention and when such a simulation is executed to search the trouble state of a machine and send a worker to repair the trouble, it becomes possible to search the trouble state of a machine by discriminating the variable state using a collected variable table and the process simulation of a production system can be executed in a short time.

Further, when the simulation programs are described in the ladder language system as in the present invention, it becomes possible to describe the simulations of the operations of component elements without using complicated branch commands and the element definition files containing the simulation programs can be prepared easily.

BRIEF DESCRIPTION OF THE DRAWINGS

FIG. 2 is a diagram a showing an example of element arrangement data that are used in the process simulation system shown in FIG. 1.

FIG. 8 is a diagram showing an example of an element array generated during the operation of the process simulation system.

FIG. 9 is a diagram showing an example of variable array generated in the operation of the process simulation system shown in FIG. 1.

FIG. 10 is a diagram showing an example of the variable array generated in the operation of the process simulation system.

FIG. 11 is a diagram for explaining the corresponding relation of external reference variables with take-out variable in the variable array generated during the operation of the process simulation system shown in FIG. 1.

FIG. 12 is a diagram for explaining the corresponding relation of the external reference variables with the variable tables generated during the operation of the process simulation system shown in FIG. 1.

FIG. 13 is a diagram showing an example of the external reference variable corresponding array generated in the operation of the process simulation system shown in FIG. 1.

FIG. 14 is a diagram showing an example of the initial process program array generated in the operation of the process simulation system shown in FIG. 1.

FIG. 17A and FIG. 17B are the plant arrangement diagrams showing an example of a production system that becomes an object for the simulation.

EMBODIMENTS OF THE INVENTION

Preferred embodiments of the present invention will be explained below with reference to the drawings.

First, the entire system configuration of the process simulation system according to an embodiment of the present invention will be explained.

Figure 1:
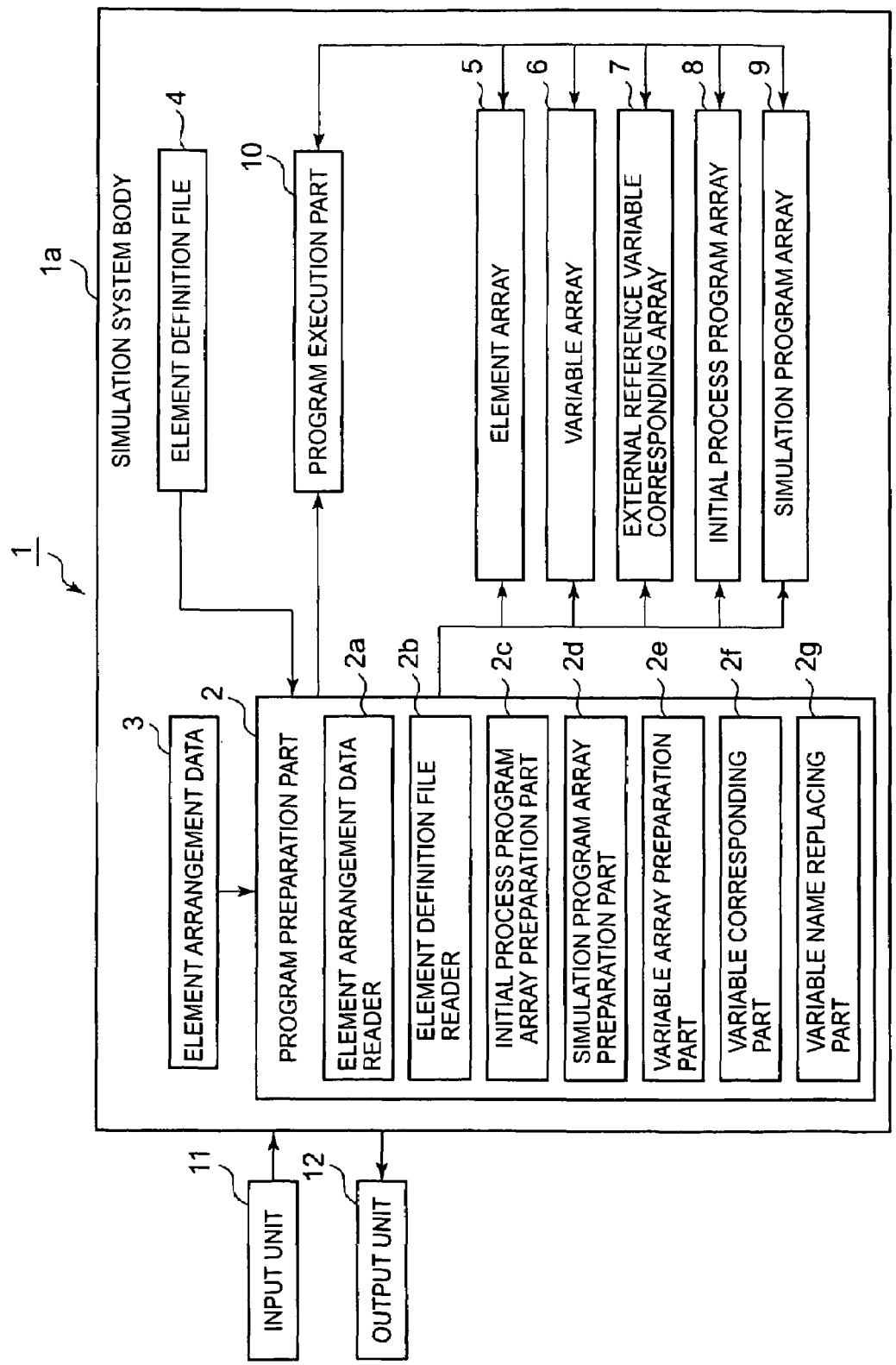
FIG. 1 is a block diagram showing the entire construction of a process simulation system according to an embodiment of the present invention.

As shown in FIG. 1, a process simulation system 1 executes a process simulation of a production system and comprises a main body of simulation system 1a, an input device 11 and an output device 12 which are connected to simulation system main body 1a. Further, input device 11 is to input various instructions (starting, stopping, etc. of a software) and comprises a mouse, a keyboard, etc. Further, output device 12 is to output (display) results of simulations, etc. and comprises a CRT, etc.

Of above-mentioned devices, simulation system main body 1a is equipped with a program generator 2 which generates simulation programs based on element arrangement data 3 and element definition file 4 and a program execution unit 10 which executes simulation programs generated by program generator 2.

Program generator 2 generates an element array 5, a variable array 6, an external reference variable corresponding array 7, an initial process program array 8 and a simulation program array 9 based on element arrangement data 3 and element definition file 4. Program generator 2 has an element arrangement data reader 2a, an element definition file reader 2b, an initial process program array generator 2c, a simulation program array generator 2d, a variable array generator 2e, a variable corresponding part 2f and a variable name replacing part 2g. Further, the details of program generator 2 including these parts 2a~2g will be described later.

The program execution unit 10 performs the initial process by executing the initial process program contained in the initial process program array 8 generated by the program generator 2 and simulates the operation of various component elements constituting a production system by executing a series of simulation programs contained in the simulation program array 9. Further, the details of the program execution unit 10 will be described later.

Further, the program generator 2 and the program execution unit 10 of the main body 1a of the simulation system are able to realize a process simulation by operating a computer program (a program for the purpose of the process simulation) on a personal computer (PC). Further, such a program for the process simulation system is stored in a recording medium that is readable by a computer such as memory, hard disc, flexible disc, CD-ROM, DVD, etc. and by reading and executing it from a processor of a computer, the functions of the program generator 2 and the program execution unit 10 are realized.

For explaining the details of the process simulation system 1 shown in FIG. 1 definitely, as a sample of a production system for which the process simulation is executed will be shown below. In this system, a work that is stocked in the front stocker is supplied to a connecting table by a conveyor, and while being conveyed by a lift and carry type conveying unit, the supplied work is processed by two processing units and then discharged to the discharge side connecting table, carried out from the discharge side connecting table by the conveyor to the rear stocker and stocked therein.

As shown in FIG. 17A and FIG. 17B, in this production system, a work W is stocked in the front stocker 101 and is supplied on a conveyor 102 by a pusher 101a of the front stocker 101.

Here, a connecting table 103 has loading portions 103a, 103a at both sides in the work conveying direction. Between these loading portions 103a, 103a, a conveyor 102 is put and the work W is conveyed on the connecting table 103 by rotating the conveyor 102. Further, a connecting table 109 has loading portions 109a, 109a. Between these loading portions 109a, 109a, a conveyor 110 is put and the work W is taken out from the connecting table 109 when the conveyor 110 is rotated and the work W is turned over to a rear stocker 111.

A lift and carry (LF conveying) device 104 connects the front and rear connecting tables 103 and 109 and two processing units (processing machines) 106, 106. The processing units 106, 106 have a rotating tool 107, respectively and move forward and backward between the original position and the machining position in the tool axial direction. In front of the work processing units 106, 106, work loading portions 108, 108 provided at both sides in the work conveying direction are arranged. Further, in connection with work loading portions 108, 108, work fixing jigs are provided but not illustrated here.

As described above, between the loading portions 103a, 109a of the connecting tables 103, 109 and the work loading portions 108, 108 located at both sides in the work conveying direction, a conveying member 105 of the lift and carry device 104 is provided. The conveying member 105 of the lift and carry device 104 goes up to a specified height from the standby position A and lifts up the work W placed on the loading portion 103a and the work loading portion 108 (the rising position B), moves forward in the conveying direction (the rising position C) by a pitch P of arrangement in the conveying direction between each processing unit 106 and the connecting table 109 and thereafter, moves down to the descending forward position D. Thus, a work W positioned at the connecting table 103 is turned over to the processing unit 106 at the rear of the conveying direction, a work W positioned at the processing unit 106 upstream of the conveying direction is turned over to the processing unit 106 downstream of the conveying direction and a work W positioned at the processing unit 106 downstream of the conveying direction is turned over to the connecting table 109.

Further, 2 persons (maintenance members A, B) are assigned to this production system for maintenance of the machines.

When the process simulation of the production system described above is executed, in the process simulation system 1, an element arrangement data 3 describing an arrangement of the component element (apparatus) constituting a production system that is an object of the simulation is first prepared. In the element arrangement data 3, various component element arrangements constituting the production system are described along the flow of a work (work flow) in combination of the process identification names and component element names and basically, corresponds to an equipment arrangement drawing within a plant. Further, the element arrangement data 3 is a tabular form data (data sheet) prepared by a software (for example, a general use spreadsheet software (EXCEL (Registered Trademark) of MICROSOFT), that is able to make the editing such as addition, deletion, replacement of textual information). Such a tabulated data sheet can also be prepared using an editing software such as a text editor.

Basically, in the element arrangement data 3 that is a tabulated data sheet, the work flow direction is set in the row (the vertical direction of the sheet: line arranged direction), the process identification name and component element name are described for one line for every process distinguished by a process identification name in the line (the lateral direction of the sheet: row arranged direction). Concretely, module names are described in the B row cell of each line, process names are described in the C row cell, and component element names are described in optional cells after the D row cells. The process identification name includes module name and process name of the same line and a process name may be omitted in some cases. In one element arrangement data 3, process identification names are described so that all of them become different names.

In the element arrangement data 3, component elements in the same specification are described in the same name. Here, two processing units are all the same "UNIT 1" and two jigs are all the same "JIG 1" and further, two conveyors, connection stands, and maintenance members are also the same specification and all of them are described in the same names.

In the element arrangement data 3, component element names that are not arranged in an actual plant are also described. The component element "INTEGRAL 1" is an element for collecting variable data that are convenient for making the overall management when executing the process simulation of a production system in a module 140T and has an "UNCLAMP T" table that integrally manages variables relative to unclamp of two JIG 1 and a variable table to integrally manage "ORIGINAL POSITION" data (not shown) of each unit 1 as described later and executes such simulation of providing an information that works can be conveyed when all jigs are unclamped and all units are at the original positions based on the unclamp information for the LF convey. Further, the component element "MAINTE-NANCE COMMAND 1" is an element for collecting variable information convenient for the collective management when the process simulation of a production system is executed; definitely, for example, data relative to the operating state of machines, working state of maintenance members, etc. are collected as described later.

Figure 3:
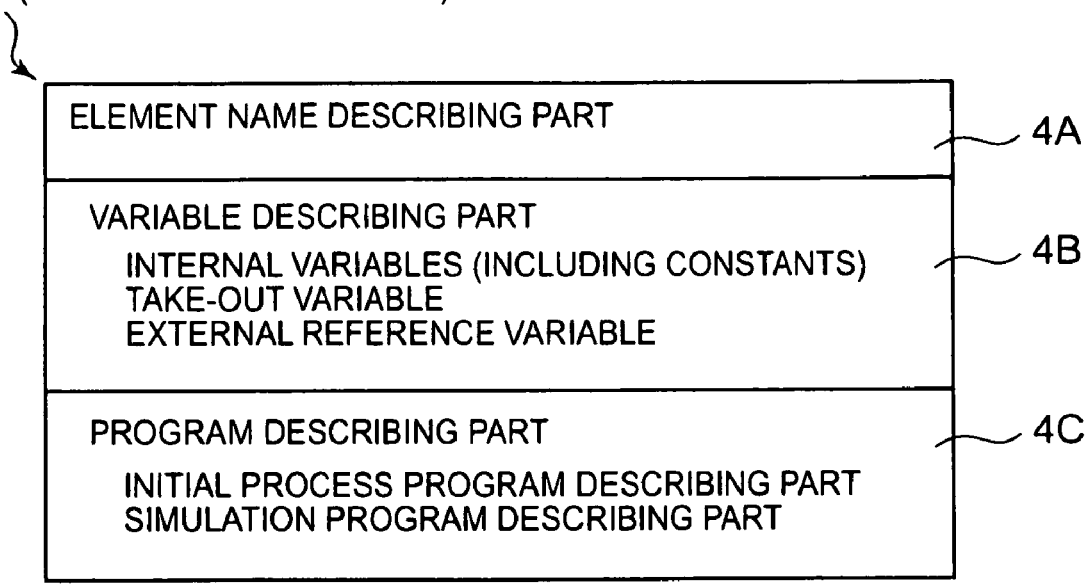
FIG. 3 is a diagram showing the general structure of element definition file that is used in the process simulation system shown in FIG. 1.
Figure 4:
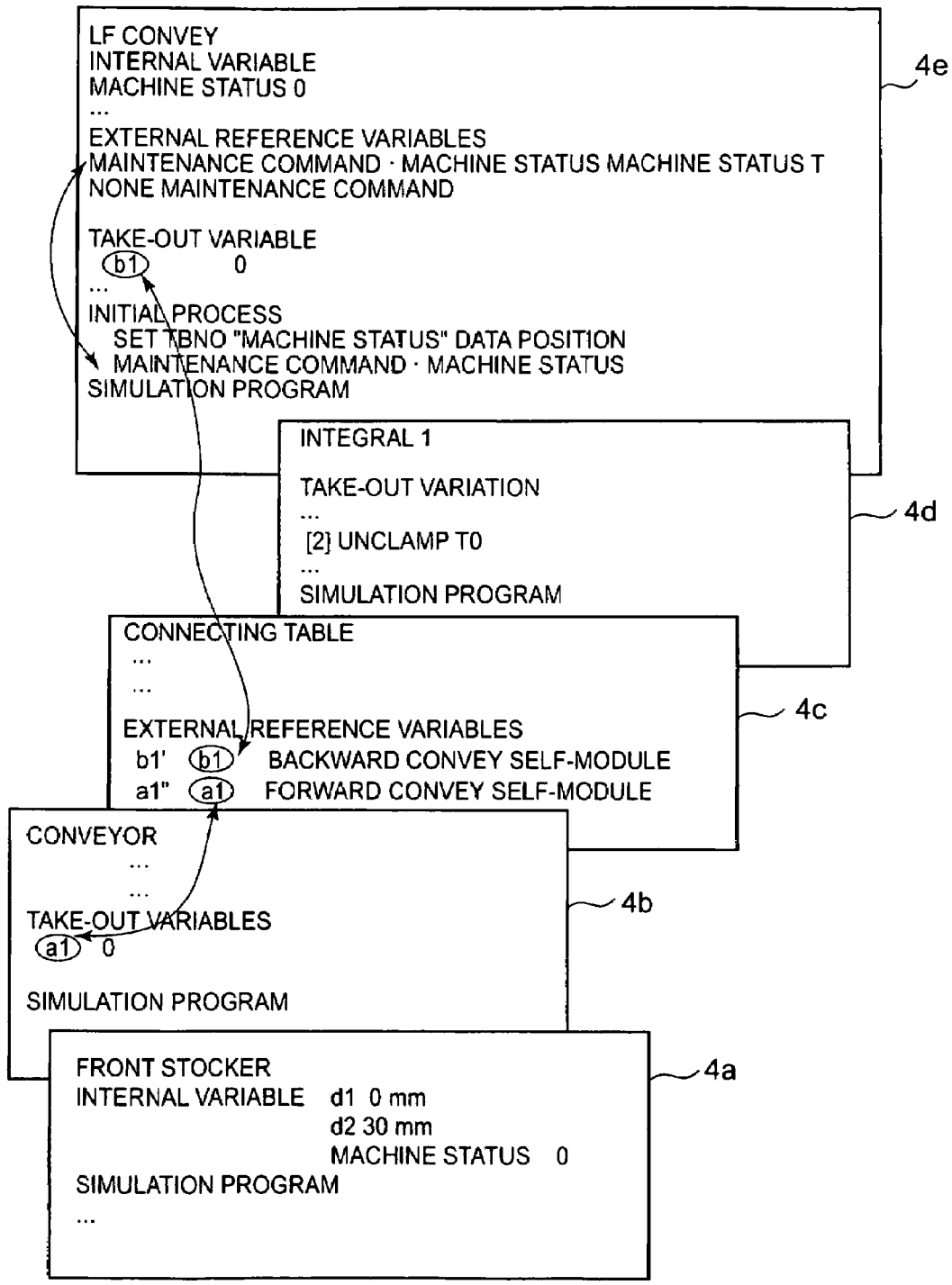
FIG. 4 is a diagram showing a concrete example of the element definition file shown in FIG. 3.
Figure 5:
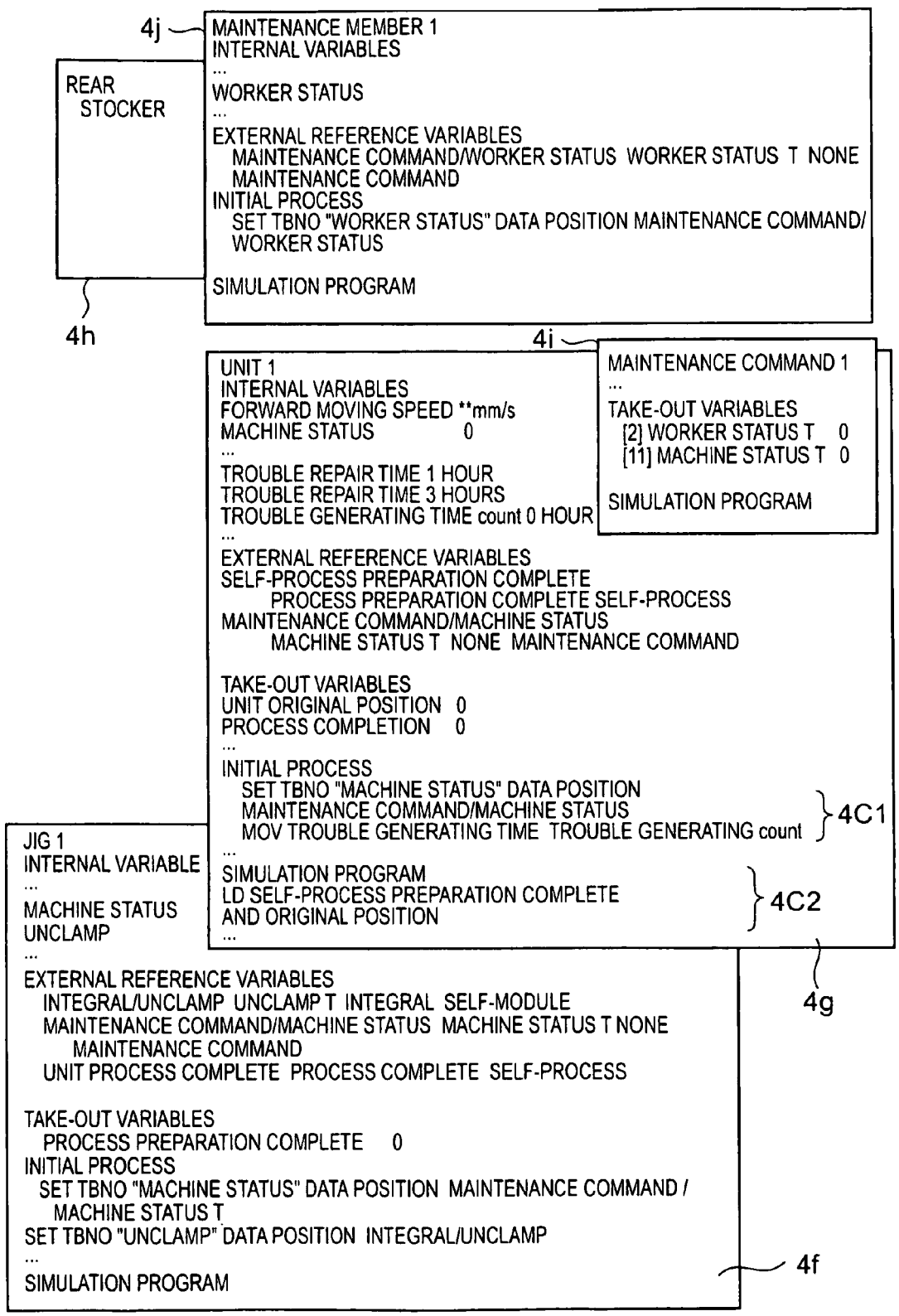
FIG. 5 is a diagram showing a concrete example of the element definition file shown in FIG. 3.

Corresponding to the component element names described in the element arrangement data 3, an element definition file 4 of which general structure is shown in FIG. 3 is prepared. Further, FIG. 4 and FIG. 5 show concrete element definition files 4a to 4j corresponding to the component element names described in the element arrangement data 3.

As shown in FIG. 3, as a general structure, the element definition file 4 contains an element name describing part 4A at the top, and followed with a variable describing part 4B and a program describing part 4C.

In the variable describing part 4B, inner variables that are used in an own simulation program (for example, the forward moving speed, backward moving speed, etc. at the time of the processing time in Unit 1 (Processing Unit)) are described together with initial values. Further, in the variable describing part 4B, external reference variables to designate referring variables are defined for an element definition file to refer variables of other element definition files, and take-out variables referred to by external reference variables are defined for an element definition file to refer variable for another element definition file jointly with initial values.

Hereinafter, external reference variables and take-out variables will be explained concretely.

External reference variables are described according to the rules shown below:

"Variable Name in Self File (External Reference Variable) Referencing Variable Name (or Referencing Variable Table Name) Referencing Process Name Module Name".

Here, referring process names and module names may be described using words showing positional relations to component elements of an element definition file in which the external reference variables are defined or specified module names and process names may be described. Further, "words expressing a relative positional relation" are such words as "Pre-Process", "Self-Process", "Next-Process" or "Pre-module", "Own-Module", "Next-Module". Here, "Pre-Process" denotes a module name and a process name at the upper side of the same column on the element arrangement data 3 to the own element, "Self-Process" denotes a module name and a process name of a component element on the same column of the own element, and "Post Process" denotes a module name and a process name of a component element at the lower side of the same column to the own element. Similarly, "Pre-Module", "Own-Module" and "Next Module" also denote a relative positional relation to the own module. Further, the referring module name (or the referring variable table name) is controlled not to overlap to a designated module name or other variable names in the process.

To be more precise, for example, in UNIT 1 and JIG 1, such a sequential operation is executed that when the clamping of JIG 1 contained in the same process is completed, UNIT 1 starts the process and when the process is completed, JIG 1 is unclamped by its process completion signal.

In this case, as such information exchange is made between UNIT 1 and JIG 1, in the element definition file of "UNIT 1" (the element definition file 4g shown in FIG. 5), it is defined that "the process preparation is completed" (external referencing variable) of "Self Process" is referred to when the self process preparation is completed". On the other hand, in the element definition file of "JIG 1" (the element definition file 4f shown in FIG. 5), "Process Preparation Completion" (i.e., the completion of a work clamp) is defined as a take-out variable. Further, in the element definition file of "JIG 1" (the element definition file 4f shown in FIG. 5), it is defined that "Unit Process Completion" as an external reference variable refers "Process Completion" of "Self Process, and in the element definition file of "UNIT 1" (the element definition file 4g shown in FIG. 5), "Process Completion" is defined as a take-out variable. Accordingly, in the state where these JIG 1 and UNIT 1 are arranged in the same process, the external reference variable and the take-out variable correspond to each other between "UNIT 1" and "JIG 1" arranged in the same column (that is, the self process) in the element arrangement data 3. In addition, the relation between the external reference variable and the take-out variable is defined. For example, the similar relation is defined between the element definition file of "Connecting Table" (the element definition file 4c shown in FIG. 4) and the element definition file of "Conveyor" (the element definition file 4c shown in FIG. 4) and the element definition file of "Connecting Table" (the element definition file 4c shown in FIG. 4) and the element definition file of "LF Convey" (the element definition file shown in FIG. 4).

Next, a case where the referencing variable of external is a variable table will be explained.

In the element definition file 4g of "UNIT 1", one of external referencing variable is defined as "Maintenance Command Machine Status Machine Status T NONE Maintenance Command".

Here, "NONE" indicates that there is no process name. In short, the variable "Maintenance Command•Machine Status indicates that it corresponds to a variable table of "Machine Status T" of the module name "Maintenance Command". In other component definition files, external reference variables relative to "Machine Status" are defined and similar descriptions are also contained in the element definition file 4f of "JIG 1" and the element definition file 4e of "LF Convey".

To correspond to this, in the element definition sheet 4i of "MAINTENANCE COMMAND 1" shown in FIG. 5, [11] Machine Status T is described as a take-out variable.

Here, the number in brackets [ ] is the number of equipment. When there is such description as this, the data register areas of "Number of Equipment (11 here)+1 are deployed in the arrangement area when "Maintenance Command 1" element definition file is read at the time when creating the variable array 6 as described later and a variable table 20 having table variables of "Machine Status T [0]~Machine Status [11]" is prepared as shown in FIG. 12(A). The external reference variable of "Maintenance Command•Machine Status" of component elements except "Maintenance Command 1" and "Integral 1" is sequentially corresponded to the table variables "Machine Status T[1]~T[11]" as take-out variables ("Maintenance Command 1" and "Integral 1" are imaginary elements and therefore, there is no variable "Machine Status"). For the variable array 6 shown in FIG. 9 and FIG. 10, as a similar variable table 20, "Worker State T" table prepared in connection to "Maintenance Command 1" or the "Unclamp T" table prepared in connection with "Integral 1" is exemplified.

Figure 2:
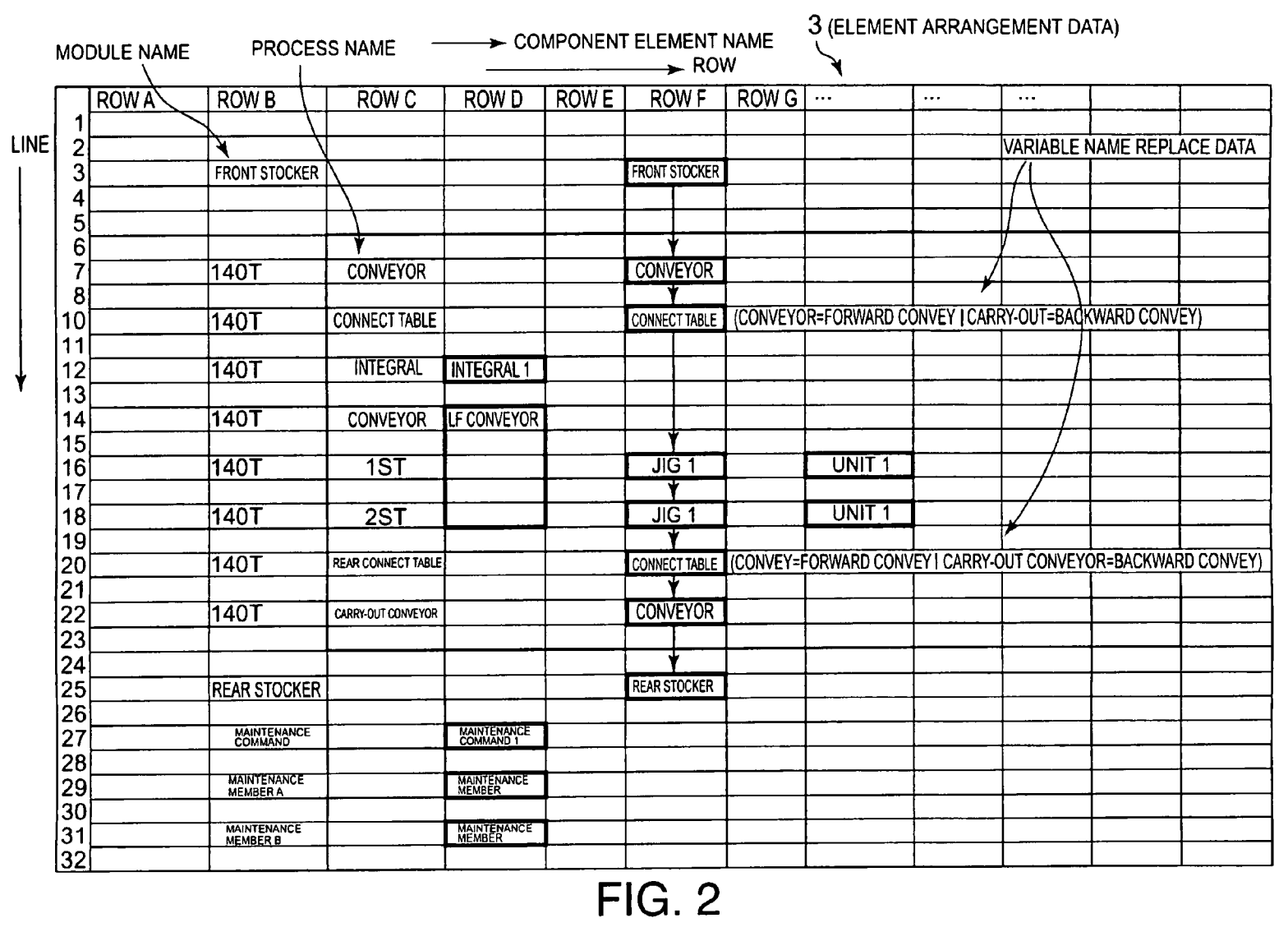

Further, as a result of component element names arranged in the element arrangement data 3 shown in FIG. 2, variables referred to by external reference variables may not be described simply in connection with the previous process or next process of the own process in some cases. For example, the component element "Connecting Table" shown in FIG. 2 is to connect the preceding and succeeding conveying elements and the preceding and succeeding conveying elements are made to external variables to be referred to. Here, in the element arrangement data 3 shown in FIG. 2, the component element "Connecting Table" at the upstream side, the preceding process in the work flow direction is "140T•Conveyor" in the preceding process and "140T•IST" in the succeeding process and the preceding and succeeding referring variables do not agree each other. Further, for the component element "Connecting Table" at the downstream side, the preceding process is "140T•2ST" and "140T•Conveyor" in the succeeding process. In this case, the preceding and succeeding reference variables are not agree each other.

Thus, in the element definition file 4c of "Connecting Table" shown in FIG. 4, while the external referencing variable process is described in such a general name as "Succeeding Convey" or "Preceding Convey", in the element arrangement data 3 shown in FIG. 2, variable name replacing data are described for the purpose of replacing the external referencing variable process names described in such general names, and the replacement is made when the variable array 6 is prepared.

That is, in the element arrangement data 3, at the upstream side component element "Connecting Table", the preceding convey is "Conveyor" and the succeeding convey is "Convey" while at the downstream side component element "Connecting Table", the preceding convey is "Convey" and the succeeding convey is "Carry-out conveyor". The objects of the preceding convey and the succeeding convey are different in connection with the component elements "Connecting Table". Originally, therefore, an element definition file should be prepared for each conveyor separately. However, variable names are replaced as described above, the preceding conveying and succeeding conveying can be dealt with even when the processes are different.

Further, as shown in FIG. 2, a variable name replacing data is described in a cell next to the cell in which a component element name is set according to the following rule.

"Variable Name after Replaced=Variable Name before Replaced"

Here, when desired to replace plural number of variables, the same descriptions are arranged in the same line.

Figure 16:
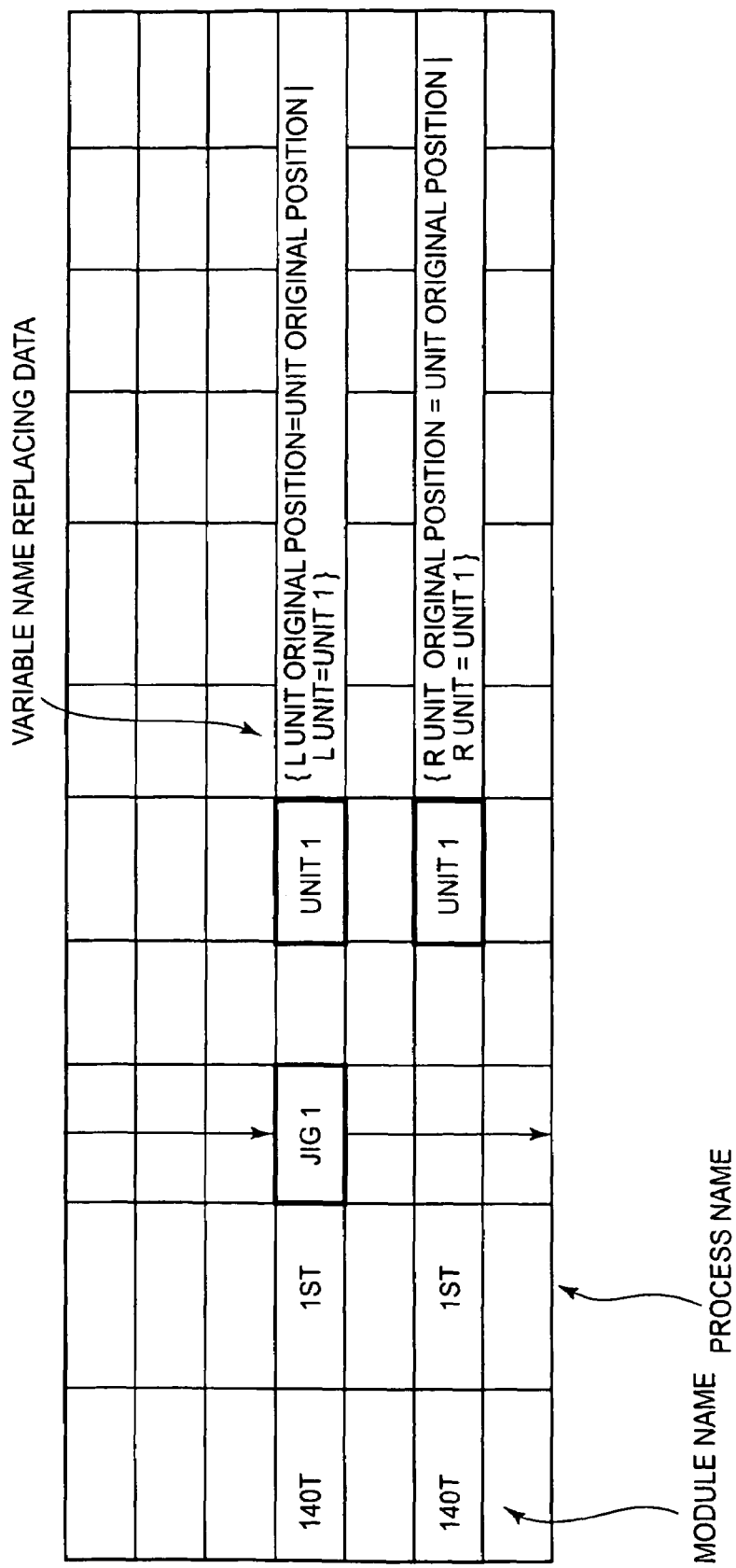
FIG. 16 is a diagram showing another example (another application example of variable name replace data) used in the process simulation system shown in FIG. 1.

Further, the replacement of variables described above can be made not only for referencing process names of external reference variables but also for all variable names described in respective element definition files. Concretely, when two same process units are laid out for the same process "140T•1st" as shown in FIG. 16, a simple combination of "Module Name+Process Name" cannot distinguish two process units. In this case, if the component names are replaced in the same method as described above, it is possible to distinguish two units, respectively. Further, in the case shown in FIG. 16, the upper side "Unit 1" is replaced to "L Unit" and the lower side "Unit 1" is replaced to "R Unit" and the original positions of respective units are replaced accordingly.

When continuously explaining by returning to FIG. 3, the program description 4C of the element definition file 4 has an initial process program description 4C1 and a simulation program description 4C2.

In the initial process program description 4C1, a data storage command (SET TBNO) for storing positions of applicable variables in the above-mentioned variable table 20 and an initial process program for data setting of variables for executing a simulation program are described.

Further, in the simulation program description 4C2, a simulation program to simulate the operations of respective component elements is described.

Concretely, in the element definition file of "Front Stocker", a program to simulate an operation to transfer works from the front stocker to the conveyor when there is a work request signal from a conveyor that becomes the rear process and works are on the front stocker is described.

In the case of the element definition file of "Conveyor", a program to simulate the operation to transmit a work request signal to the front process element or to move forward and transfer works to the rear process element when works are requested from the rear process element and works are transferred from the front process element is described.

In the case of the element definition file of "Connecting Table", a program to simulate the operation to connect conveying elements and transmit a work request signal to the front conveying element by judging the presence of works or transmit a work preparation complete signal to a next conveying element is described.

In the case of the component element definition file of "LF Convey", a program to simulate the operation to receive a work preparation complete signal from the front convey element, execute the lift and carry operation when all JIGs 1 in the self module are unclamped and UNIT 1 is at the original position and convey works sequentially is described.

In the case of the component element definition file of "JIG 1", a program to simulate the operation to clamp works by confirming the completion of the LF conveying and unclamp the work after completion of the process by UNIT 1.

In the case of the component element definition file of "UNIT 1", a program to simulate the operation to confirm the clamp by JIG 1, move forward from the original position, execute the process, move backward and return to the original position is described.

In the case of the component element definition file of "Rear Stocker", a program to simulate the operation to request works to the front process element when there is no work on the rear stocker is described.

In the case of the component element definition file of "Maintenance Members", a program to simulate the operation to judge whether a preset maintenance work time is passed for machines requiring the maintenance and judge whether the maintenance work is in process or not is described.

Further, the simulation programs thus described in the simulation program description 4C2 of the program description 4C of the element definition file 4 are desirable to have been described in a command group of stored program cyclic processing system (that is, a so-called ladder language system).

Here, taking the component element "UNIT 1" as an example, concrete examples of the simulation programs will be explained.

Figure 6:
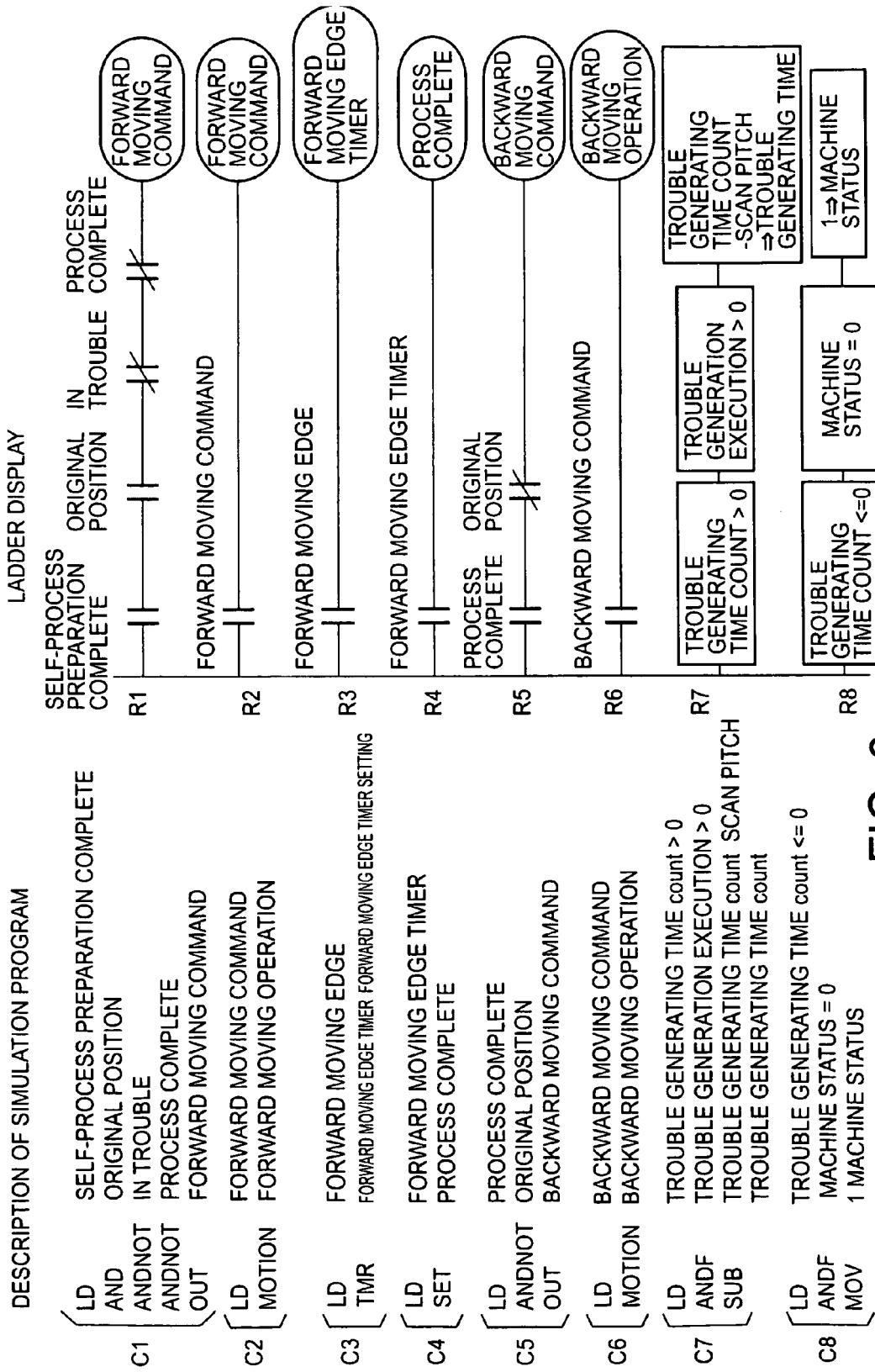
FIG. 6 is a diagram showing a concrete example of a command group contained in a simulation program that is executed in the process simulation system shown in FIG. 1.

In FIG. 6, actual simulation programs are shown at the left side and the programs expressed in the ladder display are shown at the right side.

In FIG. 6, the "MOTION" command is a simulation command of an operation and after the command, the forward movement or the backward movement is directed. Whenever this command is executed, variable values of position, speed, etc. which are objects for the operation change momentarily.

"TMR" command is a timer simulation command. When this command is executed, at the time when a time set for a variable of "Forward Moving End Timer Set" passed, a contact point is closed.

"MOV" command is a command to copy a preceding variable value to a succeeding variable.

"OUT" command is to turn a succeeding variable ON ("1").

"LD" command is a command expressing the beginning of a circuit block.

"LDF" command is a command expressing the beginning of a circuit block with the discrimination accompanied.

"AND" command is a command expressing a logical product.

"ANDNOT" command is a command expressing NAND (negative logical product).

"ANDF" command is a command expressing a logical product with comparison.

"SUB" command is a command to subtract a variable value at the middle from the top variable and put into the third variable.

"SET" command is a command to set "1" for a variable.

The command groups C1~C8 of simulation programs shown in FIG. 6 correspond to R1~R8 that are the ladder diagrams, and it is considered that what are meant by the commands described above are understood, respectively, when both of them are compared.

When explained here in detail, the command group C1 does mean to emit the forward moving command when the self process preparation is completed (this does mean that the clamping of JIG is completed), the UNITs are at the original position, machines are not in trouble and the process is not completed.

The command group C2 means to make the forward moving operation by the forward moving command.

The command group C3 means to turn the forward moving timer ON when the forward moving end is reached as a result of the forward moving operation.

The command group C4 means to complete the process when the forward moving end timer passed a set time.

The command groups C5 and C6 emit a backward moving command for the backward movement when the process is completed and UNITs are not in the original positions.

The command group C7 is a simulation program relative to generation of trouble and to execute the simulation to judge that a variable of "Trouble Generating Time Count" is more than "0" and a variable of the trouble generating execution is more than "0" (this means to generate a trouble) and when both conditions are met, store a time data set in "Trouble Generating Time count" by subtracting a time for one scan (a scan pitch) when executing the simulation program from the time data set in the "Trouble Generating Time count". Further, a time up to the trouble generation predetermined for each machine (a trouble generating time) is copied in "Trouble Generating Time count" by the initial processing program (refer to the initial processing program (see MOV) in the definition file 4g of "UNIT 1" shown in FIG. 5). Therefore, a computation to reduce a time elapsed after starting the simulation from a trouble generating time is made here.

The command group C8 judges that the computed result of the command group C7 becomes below "0"; that is, a time for the trouble generation was elapsed and if the Machine Status at that time is "Zero" (not in trouble), executes the simulation to regard a variable of the Machine Status to be "1" (Trouble).

Further, some other commands for the simulation program commands are prepared and command groups necessary for executing the operating simulation of component elements are constructed. As other commands, for example, there are commands to the variable table 20 to make the search under certain conditions, to simulate the rotational operation, etc.

In the command groups of the ladder language system described above, the processes are carried out sequentially if conditions described in a command group are not satisfied. Therefore, even when several processes are executed according to some conditions, it is possible to handle simulation programs in a more simple description without the necessity to use conditional expression (a complicated branching command) designating several jumping destinations of the program execution using complicated IF sentences.

Figure 7:
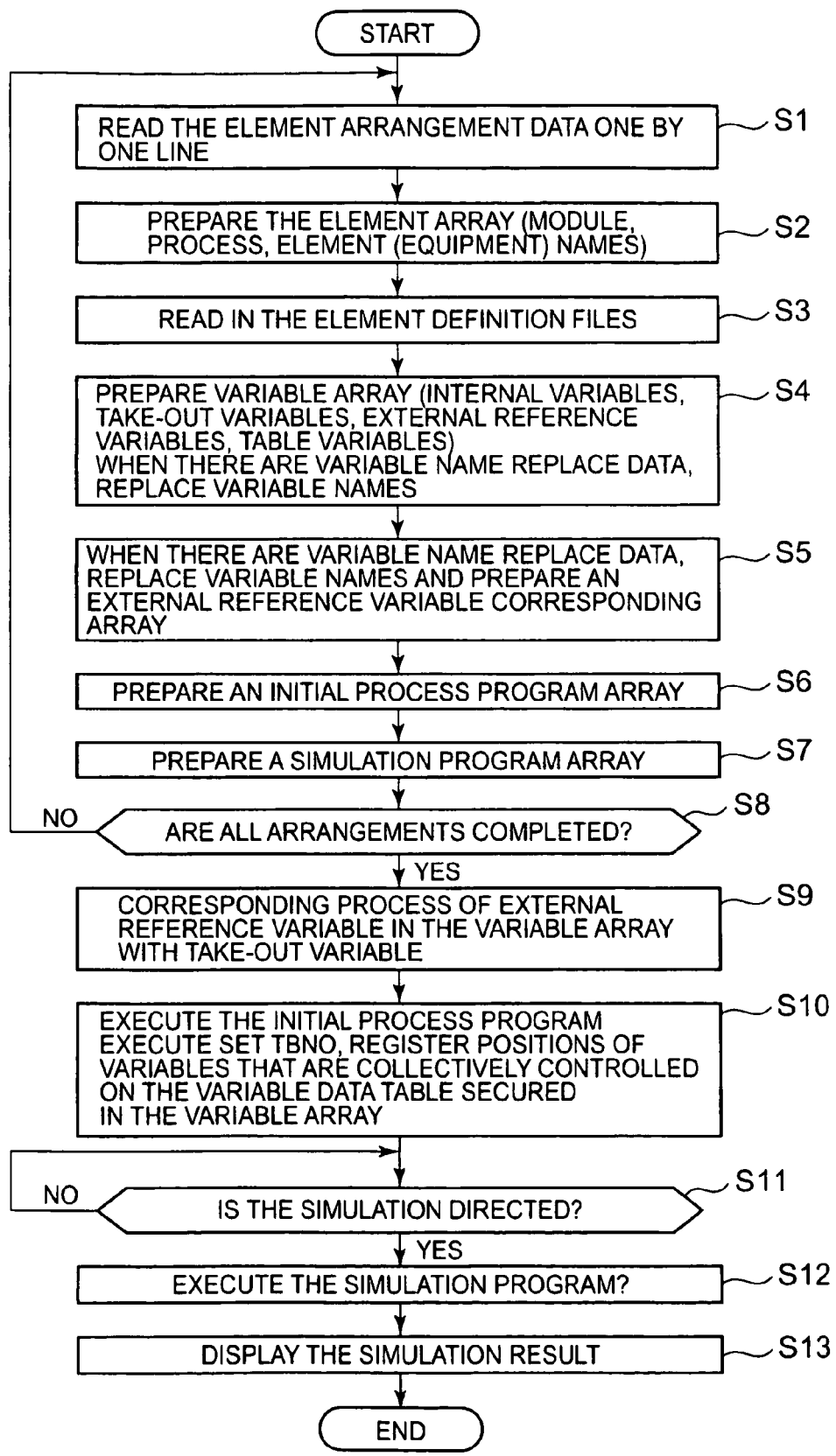
FIG. 7 is a flowchart for explaining the operation of the process simulation system shown in FIG. 1.
Figure 15:
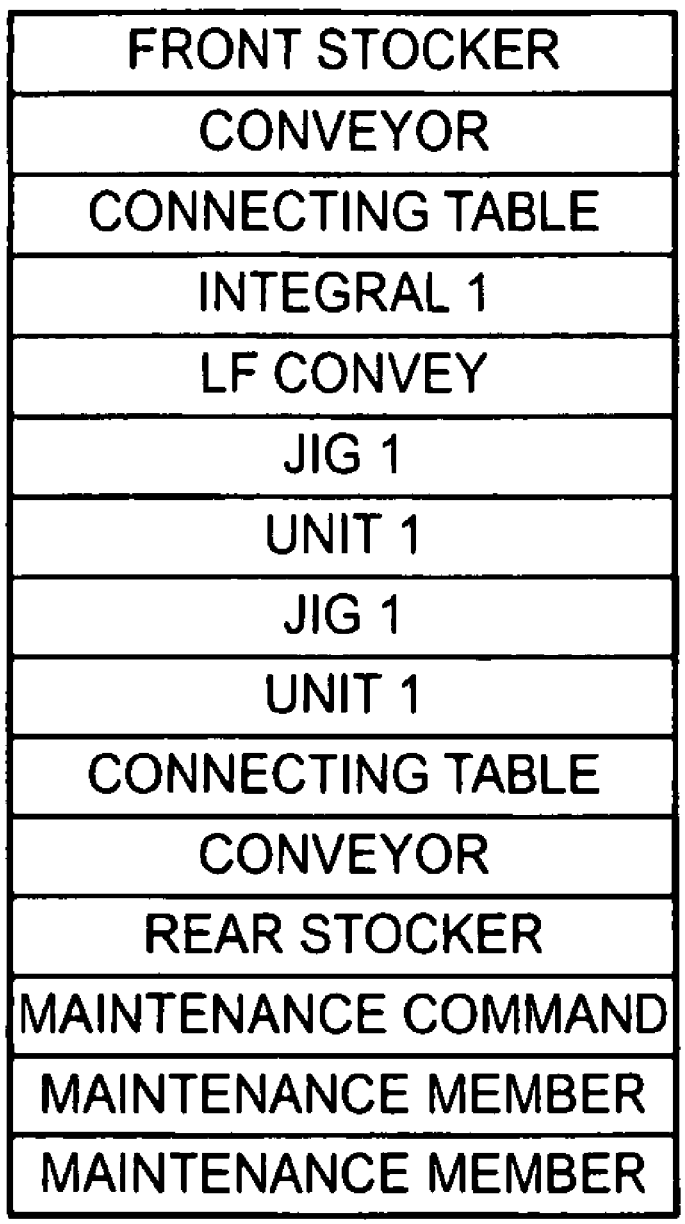
FIG. 15 is a diagram showing an example of the simulation program array generated in the operation of the process simulation system shown in FIG. 1.

Next, according to the flowchart shown in FIG. 7, the operation of the process simulation system 1 shown in FIG. 1 will be explained.

First, the simulation system reads one line of prepared element arrangement data 3 by the element arrangement data reading part 2*a* of the program preparation part 2 (Step S1). Then, the element arrangement data reading part 2*a* arranges one line of thus read module names, process names and element names in that order on one line of the element array 5 as shown in FIG. 8 (Step S2). In the element array 5 shown in FIG. 8, addresses showing the positions of respective elements in the element array 5 are recorded in front of module names. Further, these addresses are increased by one when the element arrangement data 3 are read for one line, correspondingly. Further, in the element array 5, storing positions of variables corresponding to respective elements in the variable array 6 described later are shown in the areas expressed by a top variable position and the number of variables following the element names. At this time, if there are variable name replacement data relative to element names in the element arrangement data 3, the element names are replaced by variable names after replaced by the variable replacing part 2*g* of the program preparation part 2.

Next, the element definition files 4*a*~4*j* corresponding to the component element names read by the element arrangement data reading part 2*a* are searched and read (Step S3).

All variable names and values described in the variable description 4B of the element definition file (anyone of the element definition files 4*a*~4*j*) read by the element definition file reading part 2*b* are read jointly with attributes of variables (internal variables, taken-out variables and external reference variables by the variable array preparation part 2*e* of the program preparation part 2 and are arranged in the variable array 6 as shown in FIG. 9 and FIG. 10 (Step S4). In the variable array 6 shown in FIG. 9 and FIG. 10, addresses showing positions of variables in the variable array 6 are assigned to and recorded in front of the attributes. Here, when there are variable replacement data relative to variable names in the element arrangement data 3, the variable name replacing part 2*g* of the program preparation part 2 searches if there are variable names that are to be replaced in the read variable names and if there are variable names to be replaced, replaced variable names are registered in the variable array 6. Here, in the variable array 6, in the case of external reference variables, referring variable names, referring process and module names are described following the variable names and concrete values are not contained and therefore, at the time of this step S4, attributes and variable names only are read and values are not shown (see FIG. 11(A) and FIG. 12(A)). Here, the variable array preparation part 2*e* of the program preparation part 2 also reads the variable table 20. As described in the above, the variable table 20 is developed to a variable table 20 having registration areas of "(Declared Registration Areas)+1" and registered on the variable array 6.

Further, when reading an element definition file in which external reference variables are described, the variable array preparation part 2e of the program preparation part 2 reads out external reference variable names, referring variable names, referring process names and module names by one line at a time and prepares the external reference variable corresponding array 7 as shown in FIG. 13 (Step S5). When preparing this array, if there are variable name replacing data relative to variable names in the element arrangement data 3 and this variable name replacing data contains variable names to be replaced in connection with referring variable names, the referring variable names after replaced are registered in the external reference variable corresponding array 7. For example, in the component element "140T•Connection Table•Connection Table", "Preceding Convey" is replaced with "Conveyor" and "Succeeding Convey" is replaced with "Convey" and registered in the external reference variable described in the element definition file 4c.

Next, if the initial process program was described in the element definition file 4, the initial process program is read out by the initial process program array preparation part 2c of the program preparation part 2 and registered in the initial process program array 8 as shown in FIG. 14 (Step S6). Similarly, the simulation program described in the element definition file 4 is read out by the simulation program array preparation part 2d of the program preparation part 2 and registered in the simulation program array 9 as shown in FIG. 14 (Step S7). Further, when reading these programs, variables that are used in the simulation programs are brought to correspond to the positions (addresses) of applicable variables in the variable array 6.

The processes in Steps S1~S7 are executed every time when one line of the element arrangement data 3 is read and one corresponding element definition file 4 is read. Then, when these processes are executed to the last line of the element arrangement data 3 (the element array 5), the reading of data relative to all component elements contained in the element arrangement data 3 and the preparation of the array are completed (Step S8).

However, at this point of time, external reference variables are not corresponding to referencing variables (FIG. 11(A)) and therefore, the corresponding process of them is executed while referring to the external reference variable corresponding array 7 by the variable corresponding part 2f of the program preparation part 2 and the positions (addresses) of variables in the corresponding take-out variable array 6 are written in the columns of the external reference variable values/positions that are left blank in the variable array 6 (Step S9). For example, in FIG. 11(A), the external reference variable "Self Process Preparation Complete" of "140T•1ST•Unit 1" is corresponding to the take-out variable "Process Preparation Complete" of JIG 1 of the same process and therefore, an address "R5" is registered in the external reference variable "Self Process Preparation Complete" (see FIG. 11(B)).

Here, when the variable table 20 is registered as take-out variables, the positions of the variable table 20 in the variable array 6 are registered sequentially in the value/position column of external reference variable values corresponding to the variable table 20. As shown in FIG. 12(A), external reference variables "Maintenance Command Machine Status" of respective machines are corresponding to table variables of the variable table 20 of "Machine Status T" described above.

Therefore, in the value/position columns of "Maintenance Command•Machine Status" of each machine, that were left blank at the beginning when the variable array 6 was prepared; for example, the 6th element ("140•1ST•unit 1")"Maintenance Command•Machine State" of the element arrangement data 3 having a variable "Maintenance Command•Machine Status", the 6th take-out variable of the variable table "Work State T" (here, "T0+6") is registered (See FIG. 12(B).

Then, the initial process programs contained in the initial process program array 8 are executed one by one command by the program execution part 10 (Step S10). Here, when, for example, "SET TBNO" command is executed as the initial process program, the positional data of the designated variable in the variable array 6 is written into the value/position column of a table variable shown by the designated external reference variable and at the same time, "1" is added as the number of quantity of "Work State T[0]" registered.

Concretely speaking, for example, in the initial process program corresponding to the above-mentioned component element "140T•1ST•UNIT 1", it is described as shown below.

"SET TBNO "Machine Status" Data Position Maintenance Command•Machine Status"

In this case, the position data ("Q6") of the variable "Machine Status" in the variable array 6 is written into the value column of the variable "Machine Status T[6]" of address "T0+6" shown by "Maintenance Command•Machine Status" (FIG. 12(C)). The similar process is executed between the variable table 20 of "Unclamp T" and the variable "Unclamp" of two "JIG 1" (see FIG. 9). Further, the "SET RBNO" command comprises registering means to a variable position corresponding to the variable table 20 and the registration number to the table.

As a result, as shown in FIG. 9 and FIG. 10, all internal variables, external reference variables and take-out variables that are used in the simulation are contained in the variable array 6 and the external reference variables are corresponded to take-out variables and when these variables are managed collectively, preferred variables and the variable table 20 which manages such preferred variable are corresponded to each other. Thus, values of all variables are obtained by referring to this variable array 6.

Then, when the simulation is directed by the input device 11 (Step S11), a series of simulation programs arranged in accordance with the element array 5 are executed one by one sequentially from the top by the program execution part 10 (Step S12). Here, as the descriptions of all commands of the simulation program are textual information, the program execution part 10 may execute the command description written in the textual information by interpreting the command every time when reading the command. However, when the program executing part 10 executes the command process by reading a numerical value corresponding to a command by replacing commands in advance with numerical values which are set to correspond to the command, the execution speed is promoted and preferable.

When the simulation program is thus executed, values of variables corresponding to the variable array 6 change momentarily.

The simulation program is executed repeatedly from the beginning to the last at a constant scanning pitch (an elapsed time when executing the simulation) (for example: 0.1 second interval). In the execution, variables contained in the variable array 6 are referred. This scanning pitch is optionally settable; for example, it is possible to set a scanning time so as to execute the simulation at an actual machine operating time (an actual time). Conversely, it is possible to make the pitch short and execute the simulation like fast forward. In the case of an external reference variable, a referencing variable is read out in accordance with an address of that external reference variable (a position in the variable array 6). When executing the process simulation, the simulation can be stopped at the point of time when a prescribed time is elapsed (or whenever one scanning is completed).

At this time, when it is directed to display the result of simulation by the input device 11 by designating a specific component element, a variable storing range of the variable array 6 is read out based on the element array 5, a variable name and its value are displayed together with a process identification name and a component element name by the output device 12. Thus, the result of simulation can be confirmed (Step S13). At this time, when a component element is displayed typically on the display and the change in values of variables are animated and displayed, it becomes more easy to understand.

Further, when executing the simulation program, in the component element "Maintenance Command 1", the status of all machines (normal or in trouble) is judged using a variable table "Machine Status T" and maintenance members who are not in work are searched using the variable table "Workers status T" table and maintenance members not in wok are sent for repair of machines requiring repair. In such simulation, when the variable array 6 is searched from the beginning to the last, all "Machine Status" data can be known. However, when the positions of variables (addresses in the variable array 6) are consolidated in the "Machine Status T" table regarding the "Machine Status" data for every component element as described above, all "Machine Status" data can be known by referring to data in the limited storage area and therefore, the simulation program execution time can be made short.

As described above, the process simulation relative to a certain specific element arrangement data 3 can be executed. However, for example, when it is desired to further execute the process simulation by increasing the same process as "140T•2ST" after the "140T•2ST", it is better to copy one line of "140T•2ST" using the editing function of a spreadsheet software to the element arrangement data 3, add it under "140T•2ST" as "140T•3ST", and correct related data (for example, the number of data registration areas of "Unclamp T" table, the number of data registration areas of "Machine Stats T" table, etc.) that are required to be changed as a result of the addition of these processes ("JIG 1", "UNIT 1"). When the process simulation system 1 is operated as shown in FIG. 1 according to the flowchart shown in FIG. 7, the correspondence of variables between added "JIG 1" and "UNIT 1" is determined primarily by the direction of relative referencing variables described in the element definition file 4f of "JIG 1", the element definition file 4g" on the element arrangement data 3. Therefore, unless there is change in the element definition files 4f, 4g, the simulation program array 9, variable array 6 and other arrays reflecting newly added processes are prepared. When a series of the simulation programs contained in the simulation program array 9 thus prepared are executed, the process simulation in the new organized process can be executed easily.

The invention claimed is:

1. A process simulation system including a processor and a memory coupled to the processor, the process simulation system being configured to cause the processor to execute a process simulation by simulating operations of various component elements constituting a production system so as to determine a process organization of the production system, comprising:

an element arrangement data reading unit configured to sequentially read component element names which are combined with process identification names from an element arrangement data, the element arrangement data describing an arrangement of the various component elements constituting the production system with combinations of the process identification names and the component element names along a work flow;

an element definition file reading unit configured to sequentially read element definition files corresponding to component element names which had been read in by the element arrangement data reading unit from a plurality of element definition files, the element definition files describing simulation programs for executing operational simulations of the various component elements for each of the component elements;

a program array preparing unit configured to prepare a simulation program array by sequentially arranging simulation programs respectively described in element definition files which had been read in by the element definition file reading unit; and a program execution unit configured to simulate operations of the various component elements constituting the production system by executing a series of simulation programs included in the simulation program array prepared by the program array preparing unit, wherein the element arrangement data comprise tabular form data prepared using software capable of editing to add and delete textual information, the work flow being set in a row direction, and the process identification names and the component element names being described in a line direction, wherein each of the element definition files contains a program description describing an own simulation program and a variable description describing a variable used in the own simulation program, in the variable description, an external reference variable to designate a referring variable being defined in a case of an element definition file to refer to a variable in an other element definition file, and a take-out variable referred to by an external reference variable being defined in a case of an element definition file to make an other element definition file refer to a variable, the process simulation system further comprising:

a variable array preparation unit configured to prepare a variable array including all variables described in the variable description of each of the element definition files which had been read by the element definition file reading unit; and a variable corresponding unit configured to make the external reference variable contained in the variable array prepared by the variable array preparation unit correspond to the take-out variable, wherein a variable name replacing data for replacing a variable name described in the variable description of each of the element definition files to a different variable name is described in the element arrangement data, and the process simulation system further comprising a variable name replacing unit configured to replace a variable name for which the variable name replacing data is set in the element arrangement data to an other variable name described in the variable name replacing data.

2. A process simulation system according to claim 1, wherein:

in the variable array prepared by the variable array preparation unit, a variable table provided with a required number of registration areas for collectively controlling same kinds of variables ranging among a plurality of component elements, in element definition files containing the same kinds of variables that are controlled collectively out of the element definition files, initial processing programs to register positions of the variables in the variable array are described in corresponding variable tables in the variable array prepared in accordance with the variables, the program array preparation unit prepares an initial process program array by sequentially arranging the initial process programs respectively described in the element definition files which had been read by the element definition file reading unit, and the program execution unit executes initial process programs contained in the initial process program array prepared by the program array preparation unit and registers positions of the variables in the variable array on the variable table in the variable array for the same kind of variables to be collectively controlled.

3. A process simulation system according to claim 1, wherein a simulation program described in the program description of each of the element definition files is described in a ladder language type command group.

4. A computer readable recording medium storing a program which, when executed, causes a computer to function as the process simulation system defined in claim 1.

* * * * *